United States Patent [19]

Yasuike et al.

[11] Patent Number: 4,803,627
[45] Date of Patent: Feb. 7, 1989

[54] SYSTEM FOR VEHICLE BODY ROLL CONTROL DETECTING AND COMPENSATING STEERING OPPOSITELY TO VEHICLE TURNING DIRECTION

[75] Inventors: Osamu Yasuike; Yasuji Arai; Hiroyuki Ikemoto; Nobutaka Owa, all of Toyota; Shunichi Doi, Aichi, all of Japan

[73] Assignee: Toyota Jidosha Kabushiki Kaisha, Toyota, Japan

[21] Appl. No.: 17,592

[22] Filed: Feb. 24, 1987

[30] Foreign Application Priority Data

Feb. 25, 1986 [JP] Japan ................ 61-039551

[51] Int. Cl.$^4$ ............................. B60G 21/06
[52] U.S. Cl. .................... 364/424.05; 280/707; 280/6.12
[58] Field of Search ............ 364/424, 425; 180/41; 280/707, 708, 689, 772, 6 H, 6 R, DIG. 1

[56] References Cited

U.S. PATENT DOCUMENTS

| | | | |
|---|---|---|---|
| 4,564,214 | 1/1986 | Tokunaga et al. | 280/708 |
| 4,605,244 | 8/1986 | Tanaka et al. | 280/707 |
| 4,621,832 | 11/1986 | Nakashima et al. | 364/424 |
| 4,624,476 | 11/1986 | Tanaka et al. | 280/707 |
| 4,625,993 | 12/1986 | Williams et al. | 280/6 H |
| 4,693,493 | 9/1987 | Ikemoto et al. | 280/689 |
| 4,697,237 | 9/1987 | Tanaka et al. | 280/6 H |

FOREIGN PATENT DOCUMENTS 0143984 12/1985 European Pat. Off. .
2079701 1/1982 United Kingdom .
2158018 11/1985 United Kingdom .

Primary Examiner—Gary Chin
Attorney, Agent, or Firm—Oblon, Fisher, Spivak, McClelland & Maier

[57] ABSTRACT

In this system for vehicle roll control, a plurality of actuator assemblies are provided, one corresponding to each one of the vehicle wheels and resiliently suspending it from the vehicle body. Each of these actuator assemblies is adapted to increase or decrease the vehicle height at a location corresponding to its corresponding vehicle wheel as results of control signals being supplied to it. A plurality of control means are provided corresponding to the actuator assemblies and serve to supply control signals to them. A vehicle speed detecting means senses the road speed of the vehicle, a steering angle detecting means senses the steering angle of the vehicle, and a lateral acceleration detecting means detects the lateral acceleration of the vehicle body. A means for computing and control predictingly computes the roll angle of the vehicle body from the vehicle speed sensed by the vehicle speed detecting means and the steering angle sensed by the steering angle detecting means, and controls the plurality of actuator assemblies, via the plurality of control means, in accordance with the computed roll angle, so as to reduce the rolling of the vehicle body to keep the vehicle body rolling within a determinate range. This computing and control means is further adapted to compare the direction of vehicle steering as detected by the steering angle detecting means with the direction of lateral acceleration of the vehicle body as detected by the lateral acceleration detecting means, and does not effect such controlling of the plurality of actuator assemblies, when the direction of vehicle steering is opposite to the direction of lateral acceleration of the vehicle body.

9 Claims, 6 Drawing Sheets

SYSTEM FOR VEHICLE BODY ROLL CONTROL DETECTING AND COMPENSATING STEERING OPPOSITELY TO VEHICLE TURNING DIRECTION

BACKGROUND OF THE INVENTION

The present invention relates to a roll control system for an automotive vehicle, and more specifically relates to a vehicle roll control system of the vehicle height adjustment type.

The present invention has been described in Japanese Patent Application Ser. No. Sho 61-039551 (1985), filed by an applicant the same as the entity assigned or owed duty of assignment of the present patent application; and the present patent application hereby incorporates into itself by reference the text of said Japanese Patent Application and the claims and the drawings thereof; a copy is appended to the present application.

Further, the present inventors wish hereby to attact the attention of the examining authorities to copending Patent Applications Ser. Nos. 06/921,138; 06/921,251; 06/921,450; 06/921,451; 06/921,468; 07/016,944; and 07/026,468, which may be considered to be material to the examination of the present patent application.

In general, in the operational conditions where a vehicle such as an automobile turns at a speed not less than a particular determinate turning speed value, the body of the vehicle experiences rolling, i.e. the vehicle body inclines in the radially outward direction, and this rolling results in deterioration of the drivability of the vehicle.

In order to cope with the above problem—as described in the specifications of, for example, Japanese Patent Applications Ser. Nos. Sho 60-235659, Sho 60-235660, and Sho 60-235661, which are applications filed by an applicant the same as the entity assigned or owed duty of assignment of the present patent application, and the subject matters of some or all of which are included in the above identified Patent Applications which are copending with the present Patent Application as described above, but which it is not hereby intended to admit in any way as prior art to the present application except to the extent in any case mandated by applicable law—there have been proposed to fit to a vehicle various types of vehicle height adjustment systems comprising: a plurality of actuators which are provided for resiliently suspending the vehicle wheels from its body and are adapted to increase or decrease vehicle height at locations corresponding to the associated vehicle wheels as respective results of supplying or discharging working fluid to or from variable volume working fluid chambers of said actuators; a plurality of working fluid supplying and discharging means which are provided corresponding to the actuators and which serve to supply or discharge the working fluid to or from said actuators; a vehicle speed detecting means for detecting the road speed of the vehicle; a steering angle detecting means for detecting the steering angle of the vehicle; and a control means for controlling the working fluid supplying and discharging means predictingly computing the roll angle of the vehicle body based upon the vehicle speed and the steering angle as sensed by these detecting means therefor, and for in accordance with this predicted roll angle reducing the rolling of the vehicle body so as to keep said vehicle body roll within a predetermined range.

In a vehicle equipped with such a vehicle height adjustment system as described above, however, when it should happen that, while the vehicle is turning in a certain direction, the steering wheel of the vehicle is temporarily turned in the direction opposite to said turning direction—as for example is done when drifting or skidding of the vehicle occurs while said vehicle is being driven around a curve at relatively high speed— then, since the working fluid supplying and discharging means are controlled so as to increase the vehicle height on the radially inner side of the curve based upon the steering angle as sensed by the steering angle detecting means, and since this sensed steering angle is now opposite to the actual direction of turning of the vehicle, the rolling of the vehicle body is temporarily increased even over the rolling amount which would be present if no roll control system were provided to the vehicle, and this effect, rather than improving drivability and controllability of the vehicle, on the contrary actually deteriorates these operational characteristics thereof. Further, the comfortability of the vehicle is deteriorated, and the cornering characteristics thereof also suffer.

SUMMARY OF THE INVENTION

The present invention considers the problem described above which arises in roll control through the use of such vehicle height adjustment systems as outlined above, and has as its primary object to avoid the problem detailed above.

Another object of the present invention is the provision of an improved vehicle roll control system of vehicle height adjustment type which is adapted to prevent the roll angle of the vehicle body from at any time increasing more than in the case of a vehicle not equipped with any such system for roll control via vehicle height adjustment, even in the case when the steering wheel of the vehicle is rotated in the direction opposite to the turning direction of the vehicle.

Another object of the present invention is the provision of an improved vehicle roll control system of vehicle height adjustment type, in which the roll angle of the vehicle body is restricted by adjusting the height of the vehicle body at locations corresponding to its wheels within reference vehicle body height ranges, in such a case that the steering wheel of the vehicle is rotated in the direction opposite to the turning direction of the vehicle.

Another object of the present invention is the provision of an improved vehicle roll control system of vehicle height adjustment type which is adapted to predict a roll angle of the vehicle body from the vehicle speed and the steering angle, and to control the working fluid supplying and discharging means according to the predicted roll angle, thereby to prevent previously and positively the vehicle body from rolling even in the case when rapid to and fro steering action is being performed.

Another object of the present invention is to provide a vehicle roll control system which has, in addition to the above functions, the function of properly adjusting the vehicle height within a desired vehicle height range in the case where the vehicle is not suffering from operational conditions that cause rolling of the vehicle body to an extent greater than a determinate extent.

Yet another object of the present invention is to provide a vehicle roll control system which has, in addition to the above functions, the function of taking into account the actual degree of rolling of the vehicle body, so as to more precisely prevent such vehicle body roll.

Yet another object of the present invention is to provide a vehicle roll control system which provides improved drivability for the vehicle to which it is fitted.

Yet another object of the present invention is to provide a vehicle roll control system which provides improved controllability for the vehicle to which it is fitted.

Yet another object of the present invention is to provide a vehicle roll control system which provides improved comfortability for the vehicle to which it is fitted.

Yet another object of the present invention is to provide a vehicle roll control system which provides improved cornering and road holding characteristics for the vehicle to which it is fitted.

According to a first general aspect of the present invention, these and other objects are attained by, for a vehicle comprising a body and a plurality of wheels upon which said vehicle runs, a vehicle roll control system of vehicle height adjustment type, comprising: a plurality of actuator assemblies, one provided corresponding to each one of said vehicle wheels and resiliently suspending said one of said vehicle wheels from the vehicle body, each of said actuator assemblies being adapted to increase or decrease vehicle height at a location corresponding to its corresponding vehicle wheel as results of control signals being supplied thereto; a plurality of control means which are provided corresponding to said actuator assemblies and which serve to supply control signals to said actuator assemblies; a vehicle speed detecting means for sensing the road speed of the vehicle; a steering angle detecting means for sensing the steering angle of the vehicle; a lateral acceleration detecting means for detecting the lateral acceleration of said vehicle body; and: a means for computing and control, which predictingly computes the roll angle of the vehicle body based upon the vehicle speed sensed by said vehicle speed detecting means and the steering angle sensed by said steering angle detecting means, and controls said plurality of actuator assemblies, via said plurality of control means, in accordance with said computed roll angle, so as to reduce the rolling of said vehicle body to keep said vehicle body rolling within a determinate range; said computing and control means being adapted to compare the direction of vehicle steering as detected by said steering angle detecting means with the direction of lateral acceleration of said vehicle body as detected by said lateral acceleration detecting means, and not to effect such controlling of said plurality of actuator assemblies via said plurality of control means, when said direction of vehicle steering is opposite to said direction of lateral acceleration of said vehicle body; and, according to a second general aspect of the present invention, these and other objects are attained by, for a vehicle comprising a body and a plurality of wheels upon which said vehicle runs, a vehicle roll control system of vehicle height adjustment type, comprising: a plurality of actuator assemblies, one provided corresponding to each one of said vehicle wheels and resiliently suspending said one of said vehicle wheels from the vehicle body, each of said actuator assemblies being adapted to increase or decrease vehicle height at a location corresponding to its corresponding vehicle wheels as results of control signals being supplied thereto; a plurality of control means which are provided corresponding to said actuator assemblies and which serve to supply control signals to said actuator assemblies; a plurality of vehicle height detecting means which are provided corresponding to said vehicle wheels and which serve for sensing parameters representative of the heights of the vehicle body over said vehicle wheels; a vehicle speed detecting means for sensing the road speed of the vehicle; a steering angle detecting means for sensing the steering angle of the vehicle; a lateral acceleration detecting means for detecting the lateral acceleration of said vehicle body; and: a means for computing and control, which predictingly computes the roll angle of the vehicle body based upon the vehicle speed sensed by said vehicle speed detecting means and the steering angle sensed by said steering angle detecting means, and controls said plurality of actuator assemblies, via said plurality of control means, in accordance with said computed roll angle, so as to reduce the rolling of said vehicle body to keep said vehicle body rolling within a determinate range; said computing and control means being adapted to compare the direction of vehicle steering as detected by said steering angle detecting means with the direction of lateral acceleration of said vehicle body as detected by said lateral acceleration detecting means, and, when said direction of vehicle steering is opposite to said direction of lateral acceleration of said vehicle body, to compute the differences between the actual vehicle heights as sensed by said plurality of vehicle height detection means and reference vehicle heights, and to control said plurality of actuator assemblies, via said plurality of control means, so as to keep said differences within determinate ranges.

According to the first one of the systems just specified above, the computing control means is adapted to determine whether or not the direction of vehicle steering as detected by said steering angle detecting means agrees with the direction of lateral acceleration of said vehicle body as detected by said lateral acceleration detecting means, and thus can make a determination that the steering wheel is turned in a direction opposite to the direction of turning of the vehicle when in fact such is the operational situation, and thereby it is possible for said computing and control means, in said opposite steering operational circumstances, not to effect the control of said plurality of actuator assemblies, via said plurality of control means, in accordance with the computed roll angle, as would be the case if such opposite steering operational circumstances were not prevailing. Accordingly, in such opposite steering operational circumstances, the vehicle will exhibit similar behavior to that presented by a vehicle which is equipped with no roll control system of vehicle height adjustment type; and it is therefore possible according to the present invention to in these opposite steering operational circumstances reduce the rolling amount of the vehicle, as compared to the case in which, in all operational circumstances, roll control by vehicle height adjustment is performed in accordance with a roll angle which is predictingly computed.

And, further, according the latter one of the two systems just specified above, the computing and control means is adapted to determine whether or not the direction of vehicle steering as detected by said steering angle detecting means agrees with the direction of lateral acceleration of said vehicle body as detected by said lateral acceleration detecting means, and thus can make a determination that the steering wheel is turned in a direction opposite to the direction of turning of the vehicle when in fact such is the operational situation, and thereby it is possible for said computing and control means, in said opposite steering operational circumstances, to effect the control of said plurality of actuator assemblies, via said plurality of control means, not in accordance with the computed roll angle as would be the case if such opposite steering operational circumstances were not prevailing, but instead by computing the differences between the actual vehicle heights as sensed by a plurality of vehicle height detection means and reference vehicle heights, and by controlling said plurality of actuator assemblies, via said plurality of control means, so as to keep said differences within determinate ranges. Accordingly, with this second type of construction outlined above, in such opposite steering operational circumstances, the vehicle will exhibit even more well conditioned behavior than that exhibited by a vehicle fitted with a vehicle roll control system according to the construction first outlined above—which, as explained in the previous paragraph, is similar to the behavior presented by a vehicle which is equipped with no roll control system of vehicle height adjustment type. It is therefore possible according to this second aspect of the present invention to in these opposite steering operational circumstances even more positively reduce the rolling amount of the vehicle, as compared to the case in which, in all operational circumstances, roll control by vehicle height adjustment is performed in accordance with a roll angle which is predictingly computed.

And further, according to another particular specialization of the present invention, the above specified and other objects are more particularly attained by a system for vehicle roll control of either of the types specified above, further comprising a means for detecting the actual roll angle $\phi_t$ of said vehicle body, and wherein said computing control means is adapted: to compute a steady state roll angle $\phi_\infty$ from the current value of vehicle road speed as detected by said vehicle road speed detecting means and the current value of steering angle as detected by said steering angle detecting means; to advance the phase of a signal representative of said steady state roll angle $\phi_\infty$ to thereby compute a compensating value $\Phi_\infty$ of roll angle; to compute the difference $\hat{\phi}$ based upon a desired roll angle $\phi_\alpha$ of said vehicle body, said compensating value $\Phi_\infty$, and said actual roll angle $\phi_t$ following the equation:

$$\hat{\phi} = \phi a - (k_1 \Phi_\infty + k_2 \phi t)$$

where k1 and k2 are positive constants; and to control said plurality of actuator assemblies, via said plurality of control means, in accordance with said difference $\hat{\phi}$, when the absolute value of said difference $\hat{\phi}$ is larger than a determinate value.

According to such a system as just specified, since the computing control means is adapted to compute the steady state roll angle $\phi_\infty$ from the vehicle speed and the steering angle, to advance the phase of a signal representative of said steady state roll angle $\phi_\infty$ to thereby compute a compensating value $\Phi_\infty$ of roll angle, to compute the difference $\hat{\phi}$ based upon a desired roll angle $\phi_\alpha$ of said vehicle body, said compensating value $\Phi_\infty$, and said actual roll angle $\phi_t$ following the equation:

$$\hat{\phi} = \phi a - (k_1 \Phi_\infty + k_2 \phi t)$$

where k1 and k2 are positive constants, and to control said plurality of actuator assemblies, via said plurality of control means, in accordance with said difference $\hat{\phi}$, when the absolute value of said difference $\hat{\phi}$ is larger than a determinate value, it is possible thereby previously, precisely, and positively to prevent the vehicle body from rolling even during rapid steering.

And further, according to another particular specialization of the present invention, the above specified and other objects are more particularly attained by a system for vehicle roll control of either of the types first specified above, further comprising a plurality of vehicle height detecting means which are provided corresponding to said vehicle wheels and which serve for sensing parameters Hi representative of the heights of the vehicle body over said vehicle wheels, and a means for detecting the actual roll angle $\phi_t$ of said vehicle body; and wherein said computing control means is adapted: to compute the differences $\Delta$Hi between said vehicle heights Hi as detected by said vehicle height detecting means and reference vehicle heights; to compute a steady state roll angle $\phi_\infty$ from the current value of vehicle road speed as detected by said vehicle road speed detecting means and the current value of steering angle as detected by said steering angle detecting means; to advance the phase of a signal representative of said steady state roll angle $\phi_\infty$ to thereby compute a compensating value $\Phi_\infty$ of roll angle; to compute the difference $\hat{\phi}$ based upon a desired roll angle $\phi_\alpha$ of said vehicle body, said compensating value $\Phi_\infty$, and said actual roll angle $\phi_t$ following the equation:

$$\hat{\phi} = \phi a - (k_1 \Phi_\infty + k_2 \phi t)$$

where k1 and k2 are positive constants; to control said plurality of actuator assemblies, when the absolute value of said difference $\hat{\phi}$ is larger than a determinate value, via said plurality of control means, in accordance with said difference $\hat{\phi}$; and to control said plurality of actuator assemblies, when the absolute value of said difference $\hat{\phi}$ is smaller than said determinate value, via said plurality of control means, in accordance with said vehicle height differences $\Delta$Hi, so as to keep the absolute values of said vehicle height differences $\Delta$Hi below determinate values.

According to such a system as just specified, since the computing control means is adapted to compute the steady state roll angle $\phi_\infty$ from the vehicle speed and the steering angle, to advance the phase of a signal representative of said steady state roll angle $\phi_\infty$ to thereby compute a compensating value $\Phi_\infty$ of roll angle, to compute the difference $\hat{\phi}$ based upon a desired roll angle $\phi_\alpha$ of said vehicle body, said compensating value $\Phi_\infty$, and said actual roll angle $\phi_t$ following the equation:

$$\hat{\phi} = \phi a - (k_1 \Phi_{28} + k_2 \phi t)$$

where k1 and k2 are positive constants, to control said plurality of actuator assemblies, when the absolute value of said difference $\hat{\phi}$ is larger than a determinate value, via said plurality of control means, in accordance with said difference $\hat{\phi}$, and to control said plurality of actuator assemblies, when the absolute value of said difference $\hat{\phi}$ is smaller than said determinate value, via said plurality of control means, in accordance with said vehicle height differences $\Delta$Hi, so as to keep the absolute values of said vehicle height differences $\Delta$Hi below determinate values, thereby it is possible to adjust the vehicle height within a desired vehicle height range when the vehicle is suffering stationary or substantially straight running conditions; and, when the vehicle is suffering a turning condition, it is yet further possible to control the flow rate of the working fluid supplied to or discharged from the working fluid pressure chambers of the actuators (or *mutatis mutandis*, if the actuators are not hydraulically operated) at a value corresponding to the predicted roll angle and the actual roll angle, disregarding whether or not vehicle height difference and/or rolling of the vehicle body have actually occurred, to thereby previously and positively prevent the vehicle body from rolling even during rapid steering.

According to a detailed characteristic of the present invention, in both of the two constructions initially specified above, said determinate vehicle body rolling range may represent substantially zero vehicle body rolling.

And, according to yet another detailed characteristic of the present invention, in both of the two constructions initially specified above, said computing control means may comprise a memory means, and said memory means may store the relationship between vehicle speeds, steering angles, and steady state vehicle body rolling angles.

Further, according to yet another detailed characteristic of the present invention, in the first one of the two constructions initially specified above there may be further comprised a means for detecting the actual roll angle of said vehicle body, said means comprising a plurality of vehicle height detecting means which are provided corresponding to said vehicle wheels and which serve for sensing parameters representative of the heights of the vehicle body over said vehicle wheels, said computing control means being adapted to compute both a roll angle of said vehicle body with respect to the front vehicle wheels and also a roll angle of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle the average of these two roll angles.

And, yet further, according to yet another detailed characteristic of the present invention, in the second one of the two constructions initially specified above there may be further comprised a means for detecting the actual roll angle of said vehicle body which comprises said plurality of vehicle height detecting means, wherein said computing control means is adapted to compute both a roll angle of said vehicle body with respect to the front vehicle wheels and also a roll angle of said vehicle body with respect to the rear vehicle wheels from vehicle height differences between the left and the right sides of said vehicle body based upon the vehicle heights sensed by said vehicle height detecting means and the distances between the left and the right vehicle wheels, and to compute as an actual roll angle the average of these two roll angles.

THEORETICAL BACKGROUND

Next, the principles of the roll control according to various aspects of the present invention will be described, prior to the description of the preferred embodiment of the present invention.

First, the movement of a vehicle can be expressed in the following movement equations with respect to the three movements, i.e. the lateral translation w, the yaw movement r, and the rolling movement $\phi$:

$$\Sigma M\dot{u} = \Sigma M(-Vr + g\phi) + \sum_{i=1}^{4} Fsi \quad (1)$$

$$\Sigma Iz\dot{r} = \Sigma N\psi \quad (2)$$

$$Ix\ddot{\phi} = 2(MufZf + MurZr)(\dot{u} + Vr - g\phi) + \Sigma N\phi \quad (3)$$

where:
- $\Sigma M$ is the total weight of the vehicle;
- Muf is the sprung mass for the front wheels;
- Mur is the sprung mass for the rear wheels;
- Zf is the vertical distance from the center of gravity of the vehicle to the rotational axis of the front wheels;
- Zr is the vertical distance from the center of gravity of the vehicle to the rotational axis of the rear wheels;
- V is the vehicle speed;
- Fsi is the side force;
- r is the yaw rate;
- $\phi$ is the roll angle;
- Iz is the yaw moment of inertia;
- Ix is the roll moment of inertia;
- $N\phi$ is the yaw moment;
- $N\phi$ is the roll moment;
- g is the acceleration due to gravity; and
- u is the lateral translation speed.

Further, from the equations (1) through (3), a steady state movement of the vehicle is assumed with respect to the case where the vehicle speed is V and the steering angle is $\delta$. The steady state movement of a simple vehicle model is expressed in the following equations with respect to the lateral translation, the yaw movement, and the rolling movement:

$$\Sigma MVr + 2Csf \frac{u + Af \cdot r}{V} + 2Csr \frac{u - Ar \cdot r}{V} = 2Csf\delta \quad (1')$$

$$2AfCsf \frac{u + Af \cdot r}{V} - 2ArCsr \frac{u - Ar \cdot r}{V} = 2AfCsf\delta \quad (2')$$

$$2ZfCsf \frac{u + Af \cdot r}{V} + 2ZrCsr \frac{u - Ar \cdot r}{V} + \phi = 2ZfCsf\delta \quad (3')$$

where:

$$= \frac{Tf}{2}\left(KfTf + 2\frac{Rf}{Tf}\right) + \frac{Tr}{2}\left(KrTr + 2\frac{Rr}{Tr}\right)$$

- Csf is the cornering power in the front wheels;
- Csr is the cornering power in the rear wheels;
- Af is the horizontal distance from the center of gravity of the vehicle to the rotational axis of the front wheels;
- Ar is the horizontal distance from the center of gravity of the vehicle to the rotational axis of the rear wheels;
- Tf is the tread of the front wheels;
- Tr is the tread of the rear wheels;
- Rf is the rigidity of the stabilizer for the front wheels;
- Rr is the rigidity of the stabilizer for the rear wheels;
- Kf is the spring rate of the suspension springs for the front wheels; and Kr is the spring rate of the suspension springs for the rear wheels;

Using vehicle speed V and steering angle δ, the above equations (1') through (3') can be rewritten as follows:

$$2\frac{Csf + Csr}{V} \cdot u + \frac{\Sigma M \cdot V^2 + 2(AfCsf - ArCsr)}{V} \cdot r = 2Csf\delta \quad (4)$$

$$2\frac{AfCsf - ArCsr}{V} \cdot u + 2\frac{Af^2Csf + Ar^2Csr}{V} \cdot r = 2AfCsf\delta \quad (5)$$

$$2\frac{ZfCsf + ZrCsr}{V} \cdot u + \quad (6)$$

$$2\frac{AfZfCsf - ArZrCsr}{V} \cdot r + K\phi = 2ZrCsf\delta$$

The above equations (4) through (6) can be expressed in matrix form as follows:

$$\begin{pmatrix} a_{11} & a_{12} & 0 \\ a_{21} & a_{22} & 0 \\ a_{31} & a_{32} & a_{33} \end{pmatrix} \begin{pmatrix} u \\ r \\ \phi \end{pmatrix} = \begin{pmatrix} b_1 \\ b_2 \\ b_3 \end{pmatrix} \quad (7)$$

Now, by making replacement as follows and applying the Cramer's formula, a predicted steady state roll angle $\phi_\infty$ of the vehicle may be expressed as follows:

$$D = \begin{pmatrix} a_{11} & a_{12} & 0 \\ a_{21} & a_{22} & 0 \\ a_{31} & a_{32} & a_{33} \end{pmatrix} D_\infty = \begin{pmatrix} a_{11} & a_{12} & b_1 \\ a_{21} & a_{22} & b_2 \\ a_{31} & a_{32} & b_3 \end{pmatrix} \quad (8)$$

$$\phi_\infty = D_\infty/D \quad (9)$$

Thus, as shown in FIG. 5, from the relationship defined by the equation (9) a graph may be obtained which shows the relationship between the vehicle speed V, the steering angle δ, and the steady state roll angle $\phi_\infty$.

Also, as will be seen hereinafter, by predicting the steady state roll angle $\phi_\infty$ corresponding to the vehicle speed V and each instantaneous value of steering angle which varies gradually at each instantaneous vehicle speed V, by advancing the phase of a signal indicative of the steady state roll angle to thereby compute a compensating value $\Phi_\infty$ of roll angle, by computing the difference $\hat{\phi}$ based upon the desired roll angle $\phi_a$, the compensating value $\Phi_\infty$, and the actual roll angle $\phi_t$ following the equation:

$$\hat{\phi} = \phi_a - (k_1\phi_\infty + k_2\phi_t)$$

where k1 and k2 are positive constants, and by controlling the working fluid supplying and discharging means incorporated in the vehicle height adjustment system with a duty ratio which is determined according to the difference $\hat{\phi}$, it is possible to compensate for the time lag in roll control during the turning periods as well as to perform accurate roll control, to thereby prevent previously, positively, and precisely the vehicle body from rolling.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts in the various figures; and:

DESCRIPTION OF THE PREFERRED EMBODIMENT

Figure 1:
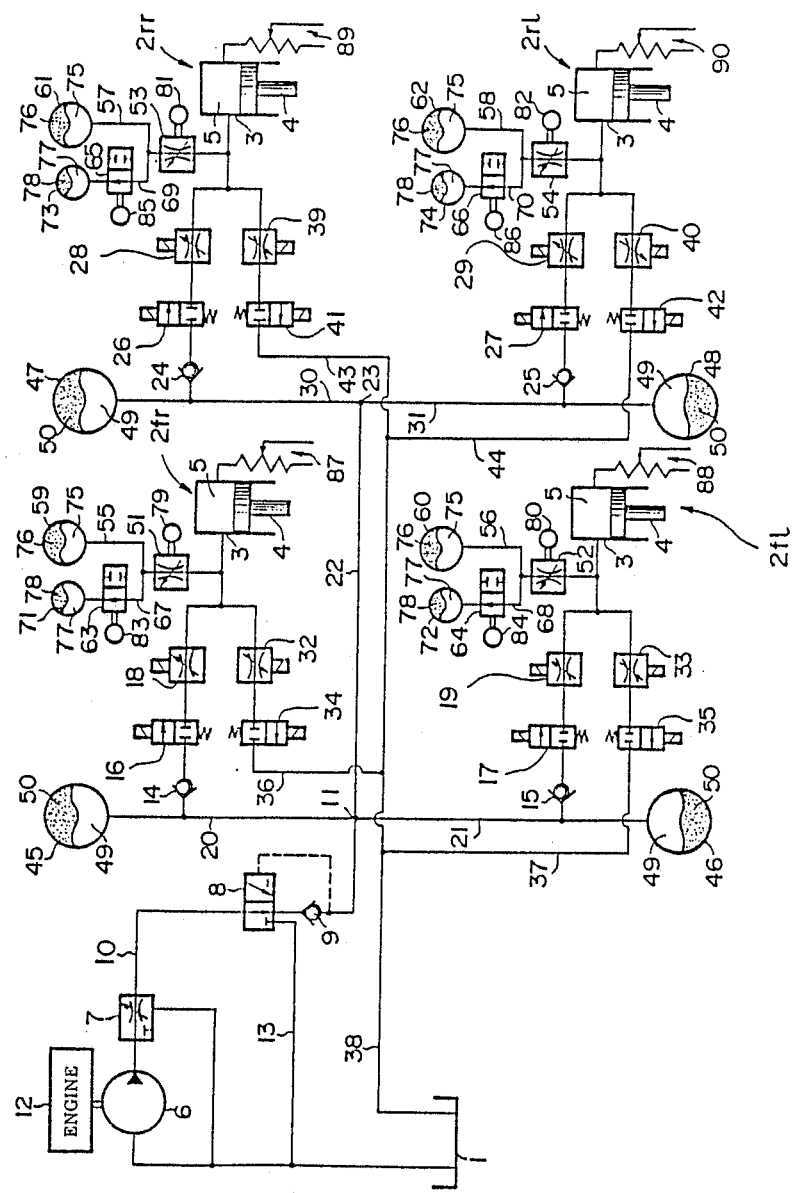
FIG. 1 is a schematic diagram showing major physical components of the preferred embodiment of the system for roll control for an automotive vehicle of the present invention.
Figure 2:
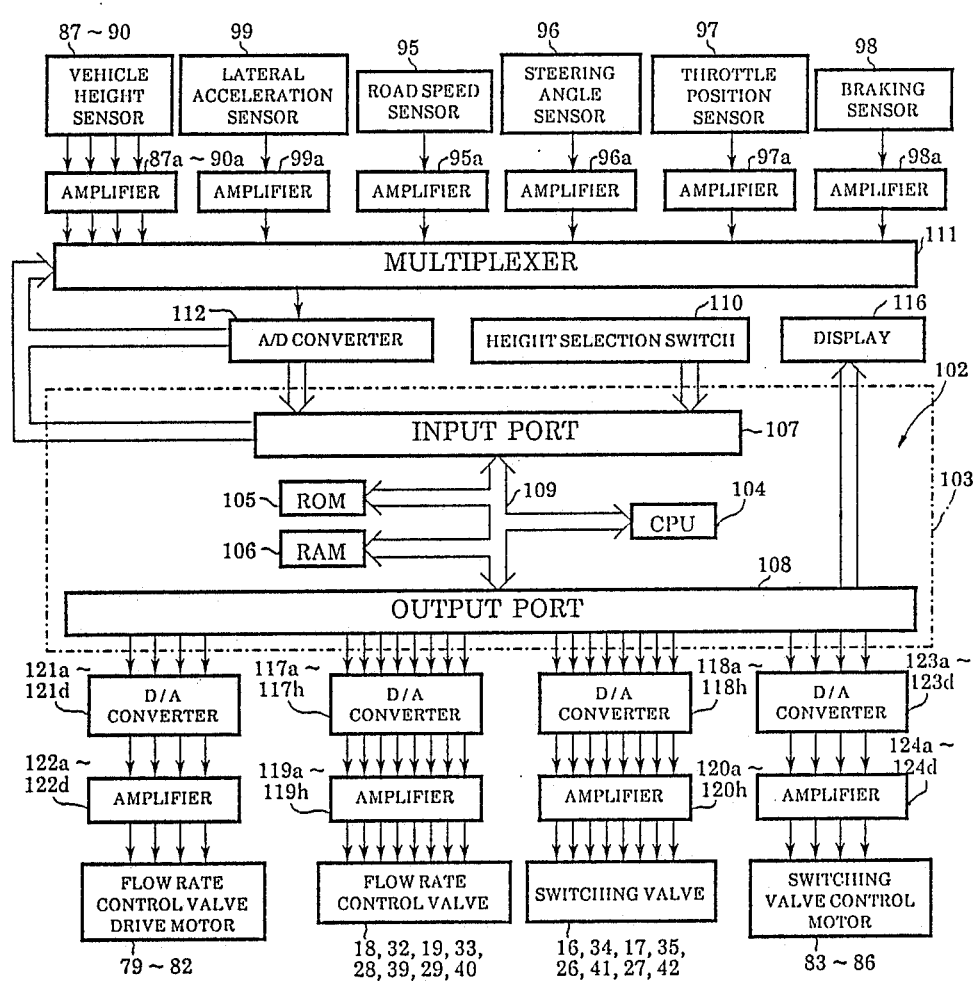
FIG. 2 is a block diagrammatical view showing the internal construction of an electrical control device, of a type incorporated in said preferred embodiment of the system for roll control for an automotive vehicle of the present invention, incorporating a micro computer.

The present invention will now be described with reference to the preferred embodiment thereof, and with reference to the figures. FIG. 1 is a schematic diagram showing major physical components of said preferred embodiment of the system for automotive vehicle roll control of the present invention, and FIG. 2 is a block diagrammatical view showing the internal construction of an electrical control device incorporating a micro computer, incorporated in said preferred embodiment.

OVERALL SUSPENSION SYSTEM CONSTRUCTION

Referring first to FIG. 1 which shows the gross mechanical components incorporated in the vehicle roll control system of the present invention that are utilized for vehicle height and ride adjustment, in this figure the reference numeral 1 denotes a suspension working fluid reservoir or sump, while 2fl, 2fr, 2rl, and 2rr are actuator assemblies which are provided to, respectively, the front left vehicle wheel, the front right vehicle wheel, the rear left vehicle wheel, and the rear vehicle wheel;

none of these vehicle wheels is particularly shown in any of the figures. And, in and for each of said actuator assemblies 2fl, 2fr, 2rl, and 2rr, the reference numeral 3 denotes a cylinder and the reference numeral 4 denotes a piston sliding in said cylinder and cooperating with a closed end thereof to define an actuating pressure chamber 5. Each of said vehicle wheels is rotationally mounted about a substantially horizontal axis (not shown) to a member such as a suspension arm (not shown either) or the like which is suspended from the body (also not shown) of the vehicle by means of a flexible linkage of some per se known sort, and each of said actuator assemblies 2fl, 2fr, 2rl, and 2rr is arranged to have one of its cylinder 3 and its piston 4 drivingly coupled to one of said vehicle body and said suspension arm, while the other of its said cylinder 3 and its said piston 4 is drivingly coupled to the other of said vehicle body and said suspension arm. Thus, by pressurization by suspension working fluid (abbreviated hereinafter in this specification merely as "fluid") of the pressure chamber 5 defined by said cylinder 3 and said piston 4, each of said actuator assemblies 2fl, 2fr, 2rl, and 2rr serves for maintaining and adjusting the sprung height from the road surface of the portion of the vehicle body above its associated vehicle wheel, and for determining the characteristics of the springing of its said associated vehicle wheel. In other possible embodiments of the vehicle roll control system of the present invention, other constructions would be possible for these actuator assemblies 2fl, 2fr, 2rl, and 2rr, as long as each was capable of increasing and decreasing the sprung height of the portion of the vehicle body above its associated vehicle wheel, corresponding to the supply and the discharge of fluid to a working fluid chamber thereof, or to some other controlling parameter, and as long as the pressure in the working fluid chamber (or the like) increased and decreased (or the like) in response respectively to bound and rebound of said associated vehicle wheel.

Fluid is sucked up from the reservoir 1 by a fluid pump 6 rotationally driven by the engine 12 of the vehicle to which this suspension system is fitted, and a pressurized supply thereof is fed via a conduit 10 through, in order, a flow rate control valve 7, a load mitigating valve 8, and a one way check valve 9 to a conduit junction point 11, and thence via another conduit 22 said pressurized fluid is fed to another conduit junction point 23. The flow rate control valve 7 is constructed so as to control the flow rate of fluid in the conduit 10 according to a signal which it receives. The load mitigating valve 8 is constructed so as to be responsive to the pressure in the conduit 10 downstream of the one way check valve 9 and so as to vent a certain amount of the pressurized fluid in said conduit 10 via a conduit 13 back to a point in said conduit 10 upstream of the pump 6, so as to maintain said pressure in the conduit 10 downstream of the one way check valve 9 at no more than a determinate pressure value. And the check valve 9 prevents the fluid from flowing backwards through the conduit 10 from the conduit junction points 11 and 23 towards the load mitigating valve 8.

The conduit junction point 11 is connected to the cylinder chamber 5 of the actuator 2fr for the front right vehicle wheel via a conduit 20 at intermediate points along which there are provided, in order, a one way check valve 14, an electrically controlled ON/OFF switching valve 16, and an electrically controlled flow rate control valve 18. Similarly, said conduit junction point 11 is connected to the cylinder chamber 5 of the actuator 2fl for the front left vehicle wheel via a conduit 21 at intermediate points along which there are provided, in order, a one way check valve 15, an electrically controlled ON/OFF switching valve 17, and an electrically controlled flow rate control valve 19. The other conduit junction point 23 is connected to the cylinder chamber 5 of the actuator 2rr for the rear right vehicle wheel via a conduit 30 at intermediate points along which there are provided, in order, a one way check valve 24, an electrically controlled ON/OFF switching valve 26, and an electrically controlled flow rate control valve 28. Similarly, said other conduit junction point 23 is connected to the cylinder chamber 5 of the actuator 2rl for the rear left vehicle wheel via a conduit 31 at intermediate points along which there are provided, in order, a one way check valve 25, an electrically controlled ON/OFF switching valve 27, and an electrically controlled flow rate control valve 29. Thus, the cylinder chambers 5 for the actuators 2fr, 2fl, 2rr, and 2rl are respectively selectively supplied with pressurized fluid from the reservoir 1 via the conduits 10, 20 and 21, 22, and 30 and 31 with, as will be described in detail hereinbelow, such supply of pressurized fluid and the flow rate thereof being appropriately and properly controlled by the supply of electrical energy to the respective electrically controlled ON/OFF switching valves 16, 17, 26, and 27 and to the respective electrically controlled flow rate control valves 18, 19, 28, and 29.

To a point of the conduit 20 between the electrically controlled flow rate control valve 18 and the cylinder chamber 5 of the actuator 2fr for the front right vehicle wheel there is connected one end of a conduit 36, the other end of which is connected to a drain conduit 38. At intermediate points on said conduit 36 there are provided an electrically controlled flow rate control valve 32 and an electrically controlled ON/OFF switching valve 34. Similarly, to a point of the conduit 21 between the electrically controlled flow rate control valve 19 and the cylinder chamber 5 of the actuator 2fl for the front left vehicle wheel there is connected one end of a conduit 37, the other end of which is connected to said drain conduit 38, and at intermediate points on said conduit 37 there are provided an electrically controlled flow rate control valve 33 and an electrically controlled ON/OFF switching valve 35. And to a point of the conduit 30 between the electrically controlled flow rate control valve 28 and the cylinder chamber 5 of the actuator 2rr for the rear right vehicle wheel there is connected one end of a conduit 43, the other end of which is connected to the drain conduit 38, and at intermediate points on said conduit 43 there are provided an electrically controlled flow rate control valve 39 and an electrically controlled ON/OFF switching valve 41, while also to a point of the conduit 31 between the electrically controlled flow rate control valve 20 and the cylinder chamber 5 of the actuator 2rl for the rear left vehicle wheel there is connected one end of a conduit 44, the other end of which is connected to said drain conduit 38, and at intermediate points on said conduit 44 there are provided an electrically controlled flow rate control valve 40 and an electrically controlled ON/OFF switching valve 42. Thus, the cylinder chambers 5 for the actuators 2fr, 2fl, 2rr, and 2rl are selectively exhausted of pressurized fluid to the reservoir 1 via the respective conduits 36, 37, 43, or 44, and via the drain conduit 38, with, as will be described in detail hereinbelow, such exhausting of pressurized fluid and the flow rate thereof being appropriately and properly controlled by the supply of electrical energy to the electrically controlled ON/OFF switching valves 34, 35, 41, and 42 and to the electrically controlled flow rate control valves 32, 33, 39, and 40.

In this shown construction, although such constructional details should be understood as not limitative of the present invention, the electrically controlled ON/OFF switching valves 16, 17, 26, 27, 34, 35, 41, and 42 are constructed as normally closed switching valves incorporating such devices as solenoids (not praticularly shown), and, when no actuating electrical energy is supplied to the coil (not shown either) of one of said solenoids, the respective one of said switching valves 16, 17, 26, 27, 34, 35, 41, and 42 is closed as schematically shown in the figure so as to intercept and to prevent flow of fluid in the conduit to which said switching valve is fitted, while on the other hand, when actuating electrical energy is supplied to said coil of said one of said solenoids, said respective one of said switching valves 16, 17, 26, 27, 34, 35, 41, and 42 is opened as also schematically shown in the figure so as to allow flow of fluid in said conduit to which said switching valve is fitted. Also, the electrically controlled flow rate control valves 18, 19, 28, 29, 32, 33, 39, and 40 are constructed so as to vary the degree of restriction which they apply to their respective conduits according to the duty ratio of the current or the voltage of actuating pulse electrical signals which they receive, so as to thereby control the flow rate of fluid flowing through the conduits 20, 21, 30, 31, 36, 37, 43, and 44 respectively associated with said flow rate control valves.

To a point on the conduit 20 intermediate between the junction point 11 and the one way check valve 14, i.e. upstream of said one way check valve 14, there is connected an accumulator 45 which has a fluid chamber 49 and an air chamber 50 which are separated from one another by a diaphragm. This accumulator 45 serves to absorb fluctuations in pressure set up in the conduit 10 due to pulsations in the fluid supply provided by the pump 6 and due to the action of the load mitigating valve 8, and to accumulate pressure for the fluid in the conduit 20. Similarly, to a point on the conduit 21 intermediate between the junction point 11 and the one way check valve 15, i.e. upstream of said one way check valve 15, there is connected an accumulator 46 which has a fluid chamber 49 and an air chamber 50 which are separated from one another by a diaphragm. This accumulator 46 similarly serves to absorb fluctuations in pressure set up in the conduit 10 due to pulsations in the fluid supply provided by the pump 6 and due to the action of the load mitigating valve 8, and to accumulate pressure for the fluid in the conduit 21. And, likewise, to a point on the conduit 30 intermediate between the junction point 23 and the one way check valve 24, i.e. upstream of said one way check valve 24, there is connected an accumulator 47 which has a fluid chamber 49 and an air chamber 50 which are separated from one another by a diaphragm, and this accumulator 47 serves to absorb fluctuations in pressure set up in the conduit 22 due to pulsations in the fluid supply provided by the pump 6 and due to the action of the load mitigating valve 8, and to accumulate pressure for the fluid in the conduit 30; while, similarly, to a point on the conduit 31 intermediate between the junction point 23 and the one way check valve 25, i.e. upstream of said one way check valve 25, there is connected an accumulator 48 which has a fluid chamber 49 and an air chamber 50 which are separated from one another by a diaphragm; and this acumulator 48 similarly serves to absorb fluctuations in pressure set up in the conduit 22 due to pulsations in the fluid supply provided by the pump 6 and due to the action of the load mitigating valve 8, and to accumulate pressure for the fluid in the conduit 31.

To another point on the conduit 20 intermediate between the electrically controlled flow rate control valve 18 and the actuator 2fr for the front right vehicle wheel there is connected one end of a conduit 55, to the other end of which there is connected a main spring 59 which has a fluid chamber 75 and an air chamber 76 which are separated from one another by a diaphragm. At an intermediate point of said conduit 55 there is fitted a flow rate control valve 51 controlled by an electrically operated motor 79. And to a point on said conduit 55 between said flow rate control valve 51 and said main spring 59 there is connected one end of a conduit 67, to the other end of which there is connected a subspring 71 which has a fluid chamber 77 and an air chamber 78 which are separated from one another by a diaphragm. At an intermediate point of said conduit 67 there is fitted a normally open type ON/OFF switching valve 63 which is controlled by an electrically operated motor 83. Thus, as the volume of the cylinder chamber 5 of this actuator 2fr for the front right vehicle wheel varies in response to the bound and the rebound of said front right vehicle wheel, the fluid in said cylinder chamber 5 and in the fluid chambers 75 and 77 of this main spring 59 and this subspring 71 flows to and fro therebetween through the flow rate control valve 51, and the flow resistance caused thereby produces a vibratory damping effect. Similarly, to a point on the conduit 21 intermediate between the electrically controlled flow rate control valve 19 and the actuator 2fl for the front left vehicle wheel there is connected one end of a conduit 56, to the other end of which there is connected a main spring 60 which has a fluid chamber 75 and an air chamber 76 which are separated from one another by a diaphragm, and at an intermediate point of said conduit 56 there is fitted a flow rate cotrol valve 52 which is controlled by an electrically operated motor 80. And to a point on said conduit 56 between said flow rate control valve 52 and said main spring 60 there is connected one end of a conduit 68, to the other end of which there is connected a subspring 72 which has a fluid chamber 77 and an air chamber 78 which are separated from one another by a diaphragm. At an intermediate point of said conduit 68 there is fitted a normally open type ON/OFF switching valve 64 which is controlled by an electrically operated motor 84. Thus, as the volume of the cylinder chamber 5 of this actuator 2fl for the front left vehicle wheel varies in response to the bound and the rebound of said front left vehicle wheel, the fluid in said cylinder chamber 5 and in the fluid chambers 75 and 77 of this main spring 60 and this subspring 72 similarly flows to and fro therebetween through the flow rate control valve 52, and the flow resistance caused thereby similarly produces a vibratory damping effect. And, correspondingly with relation to the rear suspension for the vehicle, to a point on the conduit 30 intermediate between the electrically controlled flow rate control valve 28 and the actuator 2rr for the rear right vehicle wheel there is similarly connected one end of a conduit 57, to the other end of which there is connected a main spring 61 which likewise has a fluid chamber 75 and an air chamber 76 which are separated from one another by a diaphragm. At an intermediate point of said conduit 57 there is fitted a flow rate control valve 53 which is controlled by an electrically operated motor 81, and to a point on said conduit 57 between said flow rate control valve 53 and said main spring 61 there is connected one end of a conduit 69, to the other end of which there is connected a subspring 73 which also has a fluid chamber 77 and an air chamber 78 which are separated from one another by a diaphragm. And at an intermediate point of said conduit 69 there is likewise fitted a normally open type ON/OFF switching valve 65 which is controlled by an electrically operated motor 85. Thus, as the volume of the cylinder chamber 5 of this actuator 2rr for the rear right vehicle wheel varies in response to the bound and the rebound of said rear right vehicle wheel, the fluid in said cylinder chamber 5 and in the fluid chambers 75 and 77 of this main spring 61 and this subspring 73 flows to and fro therebetween through the flow rate control valve 53, and the flow resistance caused therby likewise produces a vibratory damping effect. Similarly, to a point on the conduit 31 intermediate between the electrically controlled flow rate control valve 29 and the actuator 2rl for the rear left vehicle wheel there is connected one end of a conduit 58, to the other end of which there is connected a main spring 62 which likewise has a fluid chamber 75 and an air chamber 76 which are separated from one another by a diaphragm, and at an intermediate point of said conduit 58 there is fitted a flow rate control valve 54 which is controlled by an electrically operated motor 82. And to a point on said conduit 58 between said flow rate control valve 54 and said main spring 62 there is connected one end of a conduit 70, to the other end of which there is connected a subspring 74 which has a fluid chamber 77 and an air chamber 78 which are separated from one another by a diaphragm. At an intemediate point of said conduit 70 there is fitted a similar normally open type ON/OFF switching valve 66 which is controlled by an electrically operated motor 86. Thus, as the volume of the cylinder chamber 5 of this actuator 2rl for the rear left vehicle wheel varies in response to the bound and the rebound of said rear left vehicle wheel, the fluid in said cylinder chamber 5 and in the fluid chambers 75 and 77 of this main spring 62 and this subspring 74 similarly flows to and fro therebetween through the flow rate control valve 54, and the flow resistance caused thereby similarly produces a vibratory damping effect.

As will be particularly explained hereinafter, in this preferred embodiment of the vehicle roll control system of the present invention, the damping effect C for the four vehicle wheels is arranged to be switched between three levels—high, medium, and low—according to control of the flow resistance of the flow rate control valves 51, 52, 53, and 54 by the associated respective electric motors 79, 80, 81, and 82. Also, the springing effect K, i.e. the modulus of elasticity of springing, for the four vehicle wheels is arranged to be switched between two levels—high and low—according to control of the opening and closing of the ON/OFF switching valves 63, 64, 65, and 66 by the associated respective electric motors 83, 84, 85, and 86. And, as will be described shortly, the electric motors 79, 80, 81, and 82 and the electric motors 83, 84, 85, and 86 are selectively energized and controlled by an electrical control device 102, according to signals which said electrical control device 102 receives from a vehicle speed sensor 95, a steering angle sensor 96, a throttle position sensor 97, a braking sensor 98, and a lateral acceleration sensor 99, so as to minimize nose dive, squat, and roll of the vehicle. Furthermore, vehicle height sensors 87, 88, 89, and 90 are provided respectively to the actuator 2fr for the front right vehicle wheel, the actuator 2fl for the front left vehicle wheel, the actuator 2rr for the rear right vehicle wheel, and the actuator 2rl for the rear left vehicle wheel, each functioning so as to sense the displacement of the piston 4 of its associated actuator (or of the suspension arm associated therewith, not particularly shown) so as to produce an electrical output signal representative thereof, i.e. representative of the height of the generally corresponding portion of the vehicle body from the road surface; these electrical output signals are fed to the electrical control device 102.

THE CONSTRUCTION OF THE ELECTRICAL CONTROL DEVICE 102

Referring now particularly to FIG. 2, the construction of the electrical control device 102 and of the micro computer designated as 103 incorporated therein will be explained. This micro computer 103 may, as suggested in FIG. 2, be of per se conventional construction, and in such an exemplary case incorporates a CPU (central processing unit) 104, a ROM (read only memory) 105, a RAM (random access memory) 106, an input port device 107, and an output port device 108, all of these elements being linked together by way of a two way common bus 109.

A vehicle height selection switch 110 is provided in the passenger compartment of the vehicle, capable of being accessed and controlled by the vehicel driver. This vehicle height selection switch 110 is thus settable to any one of three positions, said three positions indicating that the driver desires the vehicle height to be either high (H), normal (N), or low (L), and outputs a signal representative of its setting to the input port device 107 and thus to the micro computer 103. The input port device 107 is also supplied, via a multiplexer 111 and an A/D converter 112, with signals representative of the actual current vehicle heights, designated hereinafter as Hfr, Hfl, Hrr, and Hrl, over the four vehicle wheels outputted by the aforementioned four vehicle height sensors 87, 88, 89, and 90 respectively therefor and amplified by respective amplifiers 87a, 88a, 89a, and 90a, and with: a signal representative of the vehicle road speed V outputted from the vehicle road speed sensor 95 and amplified by an amplifier 95a, with a signal representative of the steering angle $\delta$ (considering turning to the right as positive) outputted from the steering angle sensor 96 and amplified by an amplifier 96a, with a signal representative of the throttle opening $\theta$ outputted by the throttle position sensor 97 and amplified by an amplifier 97a, with a signal representative of whether or not the braking system or systems of the vehicle is being operated outputted by the braking sensor 98 and amplified by an amplifier 98a, and with a signal representative of the lateral acceleration G of the vehicle body (considering as positive acceleration to the right side of the vehicle from the point of view of the forward motion direction thereof) outputted by the lateral acceleration sensor 99 (which is provided approximately at the center of gravity of the vehicle body) and amplified by an amplifier 99a.

In the ROM 105 there are stored reference vehicle heights Hhf and Hhr, Hnf and Hnr, and Hlf and Hlr. Hhf and Hhr are respectively the desired vehicle body heights over the front wheels and over the rear wheels when the vehicle height selection switch 110 is set to high (H); Hnf and Hnr are respectively the desired vehicle body heights over the front wheels and over the rear wheels when the vehicle height selection switch 110 is set to normal (N); and Hlf and Hlr are respectively the desired vehicle body heights over the front wheels and over the rear wheels when the vehicle height selection switch 110 is set to low (L). Thus Hhf>Hnf>Hlf and also Hhr>Hnr>Hlr. Also in the ROM 105 there are stored values representing maps corresponding to the graphs shown in FIGS. 5 through 7 which will be described hereinafter, as well as other constant values. The CPU 104 performs various calculations as will be described shortly, and based upon the results thereof selectively outputs control signals, through the output port device 108: for controlling the drive motors 79 through 82 for the respective flow rate control valves 51 through 54 via respective D/A converters 121a through 121d and via respective amplifiers 122a through 122d, for controlling the flow rate control valves 18, 32, 19, 33, 28, 39, 29, and 40 via respective D/A converters 117a through 117h and via respective amplifiers 119a through 119h, for controlling the ON/OFF switching valves 16, 34, 17, 35, 26, 41, 27, and 42 via respective D/A converters 118a through 118h and via respective amplifiers 120a through 120h, and for controlling the drive motors 83 through 86 for the respective ON/OFF switching valves 63 through 66 via respective D/A converters 123a through 123d and via respective amplifiers 124a through 124d. Further, to the output port device 108 there is connected a display unit 116 which indicates to the vehicle driver whether the desired vehicle height set by said vehicle driver on the vehicle height selection switch 110 is currently high (H), normal (N), or low (L). This display unit 116 also indicates to the vehicle driver whether the damping effect control mode set by said driver on a damping effect control mode selection switch, not particularly shown but whose output is also fed to the micro computer 103 via the input port device 107 in the same way as is the output of the vehicle height selection switch 110, is currently (a) a manual normal mode (MN) in which the damping effect for the suspension system is fixedly adjusted to low (normal), (b) a manual sports mode (MS) in which the damping effect for the suspension system is fixedly adjusted to medium (sports), (c) an auto normal base mode (ANB) in which the damping effect for the suspension system is automatically adjusted to low (soft) as a base damping force C or to high (hard) in accordance with the current values of various operational parameters of the vehicle, or (d) an auto sports base mode (ASB) in which the damping effect for the suspension system is automatically adjusted to medium as a base damping force C or to high (hard) in accordance with the current values of various operational parameters of the vehicle.

THE PREFERRED EMBODIMENT

Figure 3:
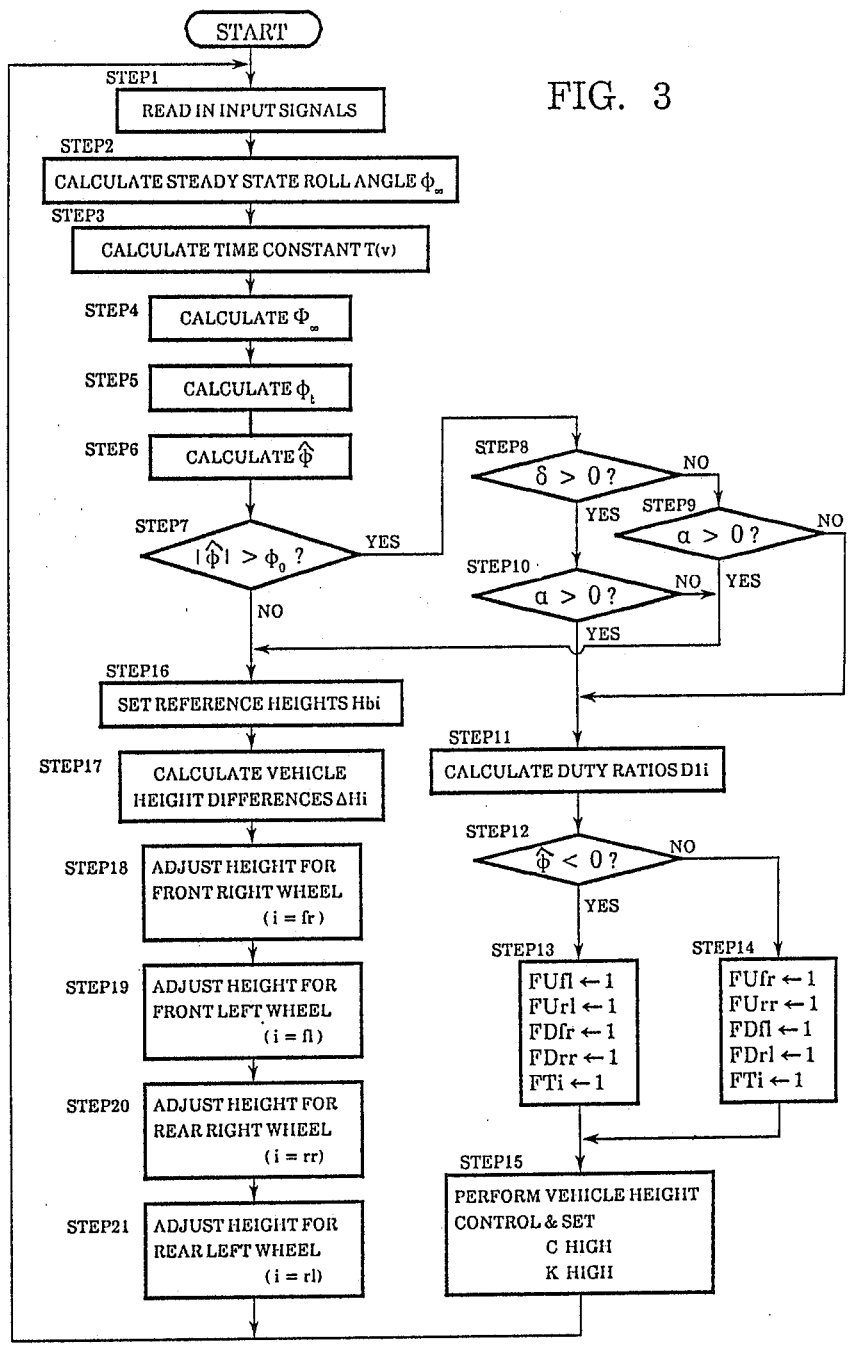
FIG. 3 is a flow chart showing the overall flow of a cyclical program which directs the operation of said micro computer utilized in the preferred embodiment of the vehicle roll control system of the present invention.
Figure 4:
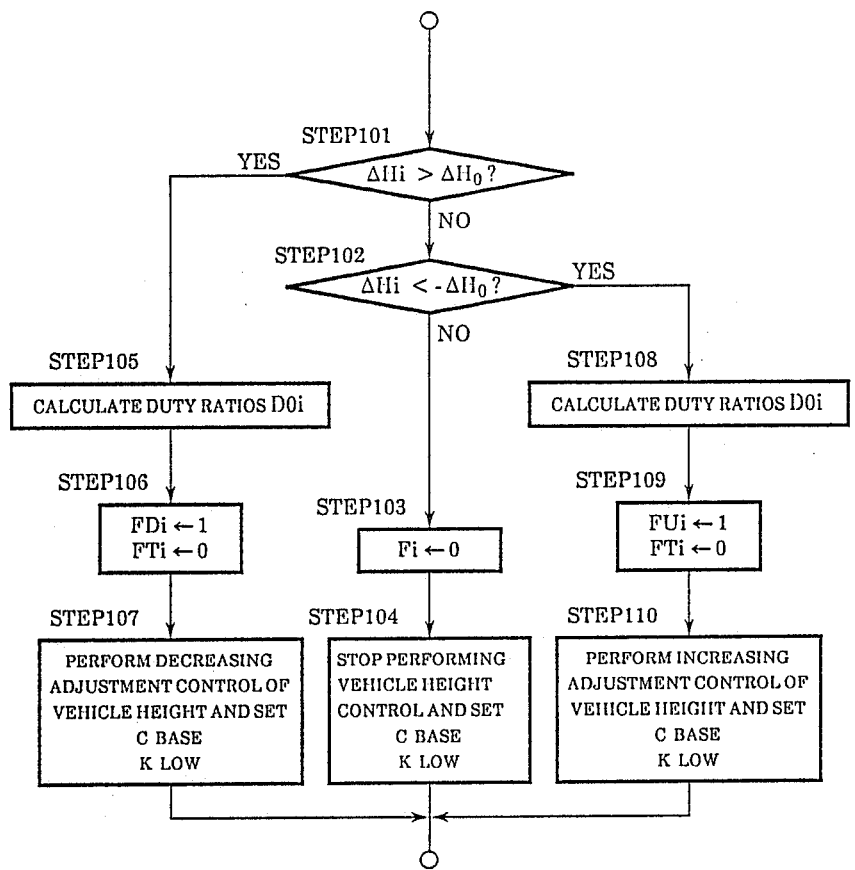
FIG. 4 is a detailed flow chart of a portion of the FIG. 3 program, showing in more detail a routine four invocations of which in FIG. 3 are abbreviated simply as four blocks.

Referring next to the flow charts shown in FIGS. 3 and 4 and the graphs shown in FIGS. 5 through 7, the operation of the micro computer 103 incorporated in the preferred embodiment of the system for vehicle roll control of the present invention as shown in gross detail in FIGS. 1 and 2 will be explained. FIG. 3 is a flow chart showing the overall flow of said operation of said micro computer 103, and it will easily and cursorily be observed that this overall program flow is a repetitive cycle which will typically take place over a certain characteristic approximate cycle time; while FIG. 4 is a flow chart showing in detail a routine which in the flow chart shown in FIG. 3 is abbreviated simply by the steps 18 through 21. In the program of FIGS. 3 and 4, each of the flags FUi (where "i" is "fr", "fl", "rr", and "rl" referring to the front right, the front left, the rear right, and the rear left vehicle wheels respectively) is concerned with whether or not an energizing electrical signal is currently being supplied to the corresponding one of the flow rate control valves 18, 19, 28, and 29, and the corresponding one of the switching valves 16, 17, 26, and 27, for supplying the corresponding one of the actuators 2fr, 2fl, 2rr, and 2rl with pressurized working fluid, and in this case a flag value of zero indicates that the energizing electrical signal is not currently being supplied while a flag value of unity indicates that an energizing electrical signal is currently being supplied. Similarly, each of the flags FDi (where "i" is again "fr", "fl", "rr", and "rl" referring to the front right, the front left, the rear right, and the rear left vehicle wheels respectively) is concerned with whether or not an energizing electrical signal is currently being supplied to the corresponding one of the flow rate control valves 32, 33, 39, and 40 and the corresponding one of the switching valves 34, 35, 41, and 42 for venting working fluid from the corresponding one of the actuators 2fr, 2fl, 2rr, and 2rl, and in this case a flag value of zero indicates that an energizing electrical signal is not currently being supplied while a flag value of unity indicates that an energizing electrical signal is currently being supplied. Further, the flags FTi (where "i" is again "fr", "fl", "rr", and "rl" referring to the front right, the front left, the rear right, and the rear left vehicle wheels respectively) are concerned with the setting of the damping effect C and of the spring rate K, and in this case a flag value of zero indicates that the damping effect C is adjusted to a base mode (low in the case of the auto normal base mode (ANB), and medium in the case of the auto sports base mode (ASB), and the spring rate K is adjusted to low, while a flag value of unity indicates that the damping effect C and the spring rate K are both adjusted to high. Further, the expression "flags Fi" will be used as a general term for referring to these flags FUi, FDi, and FTi.

In the first step 1, first, the vehicle heights Hi (where "i" is again "fr", "fl", "rr", and "rl" referring to the front right, the front left, the rear right, and the rear left vehicle wheels) detected by the respective vehicle height sensors 87 through 90, the vehicle speed V detected by the vehicle speed sensor 95, the steering angle $\delta$ detected by the steering angle sensor 96, the throttle opening $\theta$ detected by the throttle position sensor 97, the vehicle braking state detected by the braking sensor 98, the lateral acceleration $\alpha$ detected by the lateral acceleration sensor 99, the switch function S input from the vehicle height selection switch 110, and the damping effect selecting switch function input from the damping effect selecting switch not shown in the figure, are in turn read in, and then the flow of control passes to the next step 2.

Figure 5:
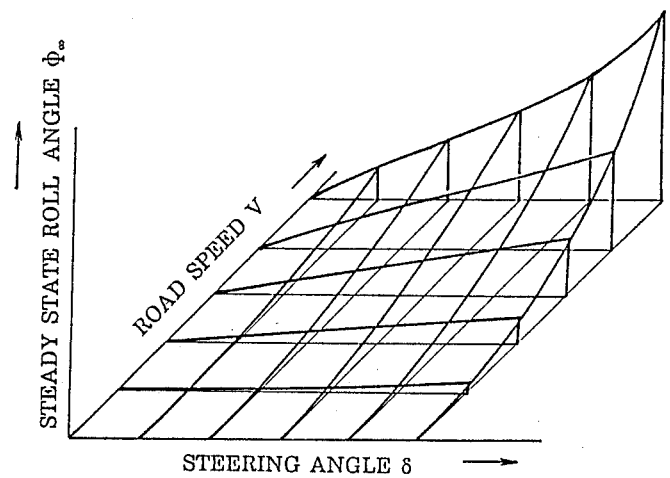
FIG. 5 is a graph relating to said preferred embodiment, exemplarily showing the positive quadrant portion of a map stored in said micro computer and corresponding to a steady state roll angle $\phi_\infty$ for the vehicle body.

In the next step 2, based upon the vehicle speed V and the steering angle $\delta$ read in in the step 1, a steady state roll angle $\phi_\infty$ is calculated from the map corresponding to the graph whose positive quadrant is shown in FIG. 5, values representative of which are stored in the ROM 105; in this case, the anticlockwise direction relative to the forward direction of the vehicle is considered positive as far as the sign of the steady state angle $\phi_\infty$ is considered. (Other quadrants of this map are not shown in FIG. 5 in the interests of convenience of drafting and explanation). Subsequently the flow of control passes to the next step 3.

In this next step 3, based upon the vehicle speed V read in in the step 1, a time constant T(v) is calculated which has vehicle speed V as a parameter and is utilized in the equation used in the step 4 to be described shortly. Subsequently the flow of control passes next to this step 4.

In this next step 4, based upon the value of $\phi_\infty$ calculated in the previous step 2 and upon the value of T(v) calculated in the previous step 3, a compensating value $\phi_\infty$ of roll angle is calculated following the equation described below, and then the flow of control passes next to the step 5. In this equation, s is the Laplace operator.

$$\phi_\infty = \frac{T(v)s}{1 + T(v)s} \phi_\infty \qquad (10)$$

In the next step 5, an actual roll angle $\phi_f$ of the vehicle body as far as the front wheels are concerned, an actual roll angle $\phi_r$ of the vehicle body as far as the rear wheels are concerned, and the instantaneous value $\phi_t$ of the roll angle of the vehicle body which is the average value of these actual roll angles are calculated, following the equations described below, and next the flow of control passes to the step 6.

$$\phi_f = \tan^{-1} \frac{Hfr - Hfl}{Tf} \qquad (11)$$

$$\phi_r = \tan^{-1} \frac{Hrr - Hrl}{Tr} \qquad (12)$$

$$\phi_t = (\phi_f + \phi_r)/2 \qquad (13)$$

In the step 6, the difference $\phi$ between a desired roll angle $\phi_a$ stored in the ROM 105 and the compensating value $\phi_\infty$ plus the instantaneous value $\phi_t$ of the roll angle is calculated, following the equation described below. Although the desired roll angle $\phi_a$ is taken as being zero in the embodiment shown, it may in fact have a constant value near zero, the absolute value of which is less than $\phi_0$ described below, and the sign of which is positive and negative when $\phi_\infty$ is positive and negative, respectively. Subsequently, the flow of control passes next to the step 7.

$$\hat{\phi} = \phi a - (k_1 \Phi_\infty + k_2 \phi t) \qquad (14)$$

where k1 and k2 are positive constants.

In the next step 7, a decision is made as to whether the absolute value of the roll angle difference $\hat{\phi}$ is greater than the controlling threshold $\phi_0$ which is a positive constant near zero. If a decision is made that the absolute value of the difference $\hat{\phi}$ is greater than $\phi_0$, then the flow of control passes next to the step 8; while, if a decision is made that the absolute value of the difference $\hat{\phi}$ is not greater than $\phi_0$, then the flow of control passes next to the step 16.

In the step 8, a decision is made as to whether or not the steering angle $\delta$ is positive. If the result of this decision is NO, so that the steering angle $\delta$ is in fact not positive, then the flow of control passes next to the step 9; while, on the other hand, if the result of this decision is YES, so that said steering angle $\delta$ is in fact positive, then the flow of control passes next to the step 10.

In the step 9, a decision is made as to whether or not the lateral acceleration $\alpha$ is positive. If the result of this decision is NO, so that the lateral acceleration $\alpha$ is in fact not positive, then the flow of control passes next to the step 11; while, on the other hand, if the result of this decision is YES, so that said lateral acceleration $\alpha$ is in fact positive, then the flow of control passes next to the step 16.

On the other hand, in the step 10, similarly a decision is made as to whether or not the lateral acceleration $\alpha$ is positive; but, if the result of this decision is NO, so that the lateral acceleration $\alpha$ is in fact not positive, then the flow of control passes next to the step 16; while, on the other hand, if the result of this decision is YES, so that said lateral acceleration $\alpha$ is in fact positive, then the flow of control passes next to the step 11.

Thus, in summary, in the steps 8 through 10, a decision is made as to whether or not the steering angle $\delta$ is in the same sense as the sense of the lateral acceleration $\alpha$ of the vehicle body, and, if these senses are the same, then the flow of control passes next to the step 11; while, on the other hand, if these senses are not the same, then the flow of control passes next to the step 16.

Figure 6:
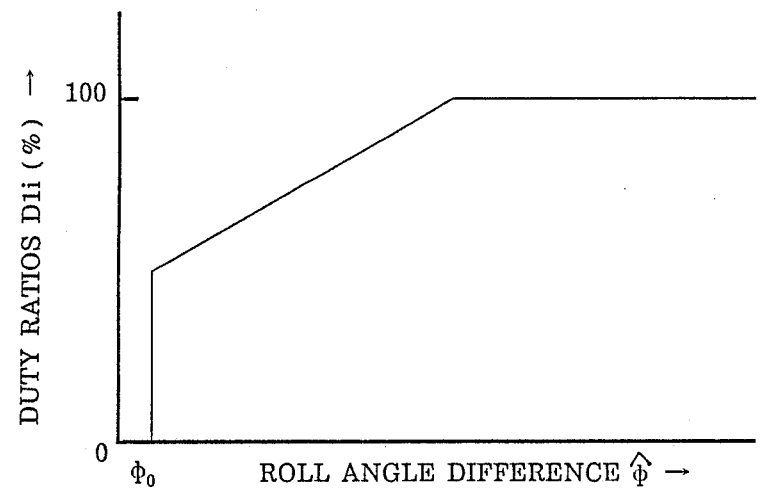
FIG. 6 is a graph relating to said preferred embodiment, exemplarily showing a map stored in said micro computer and corresponding to the duty ratio for an energizing electrical signal D1i to be supplied to a flow rate control valve for performing roll control by vehicle height adjustment.

In the step 11, based upon the roll angle difference $\phi$ calculated in the step 6, duty ratios D1i are calculated for the energizing electrical signals supplied to the flow rate control valves from maps like the map which corresponds to the graph exemplarily shown in FIG. 6 stored in the ROM 105, and then the flow of control passes to the next step 12.

In this next step 12, a decision as to whether or not the steering angle difference $\hat{\phi}$ is positive. If a decision is made that $\hat{\phi}$ is less than zero, the flow of control passes next to the step 13, while, on the other hand, if a decision is made that $\hat{\phi}$ is not greater than zero, then the flow of control passes next to the step 14.

In the step 13, the flags FUfl, FUrl, FDfr, FDrr, and FTi are set to unity. Then the flow of control passes next to the step 15.

On the other hand, in the step 14, the flags FUfr, FUrr, FDfl, FDrl, and FTi are set to unity. Then the flow of control passes next to the step 15.

In the step 15, the vehicle height control is performed. In other words, if the flow of control has arrived at this step 15 via the step 13, energizing electrical signals with duty ratios Dfl and Drl are supplied to the flow rate control valves 19 and 29 for supplying fluid to the actuator 2fl for the front left wheel and to the actuator 2rl for the rear left wheel, respectively. And, similarly, energizing electrical signals with duty Dfr and Drr are supplied to the flow rate control valve 32 and 39 for discharging fluid from the actuator 2fr for the front right wheel and from the actuator 2rr for the rear right wheel, respectively. Simultaneously, energizing electrical signals are supplied to the associated ON/-OFF switching valves 17, 27, 34, and 41 for opening them, while no energizing electrical signals are supplied to the other ON/OFF switching valves 16, 26, 35, and 42, thus leaving them closed. Thus, the vehicle height is thereby increasingly adjusted on the left side of the vehicle and is simultaneously decreasingly adjusted on the right side of the vehicle. On the other hand, if the flow of control has arrived at this step 15 via the step 14, energizing electrical signals with duty ratios Dfr and Drr are supplied to the flow rate control valves 18 and 28 for supplying fluid to the actuator 2fr for the front right wheel and the the actuator 2rr for the rear right wheel, respectively. And, similarly, energizing electrical signals with duty ratios Dfl and Drl are supplied to the flow rate control valves 33 and 40 for discharging fluid from the actuator 2fl for the front left wheel and from the actuator 2rl for the rear left wheel, respectively. Simultaneously, energizing electrical signals are supplied to the associated ON/OFF switching valves 16, 26, 35, and 42 for opening them, while no energizing electrical signals are supplied for the other ON/OFF switching valves 17, 27, 34, and 41, thus leaving them closed. Thus, the vehcile height is thereby increasingly adjusted on the right side of the vehicle and is simultaneously decreasingly adjusted on the left side of the vehicle. Further, in this step 15, in either case whether the flow of control has arrived here via the step 13 or has arrived here via the step 14, the energizing electrical signals supplied to the motors 79 to 82 and 83 to 86 are controlled to set the suspension damping effect C to high and also to set the spring rate K to high. After the flow of control has thus finished this step 15, the program flow returns back to the step 1, to loop around again and again.

On the other hand, in the other program branch in the step 16, if as detected from the signal representative thereof sent via the input port device 107 to the micro computer 103, the setting of the vehicle height selection switch 110 is high (H), then the reference vehicle heights Hbfr and Hbfl for the front wheels are set at Hhf and the reference vehicle heights Hbrr and Hbrl for the rear wheels are set at Hhr; if said setting of said vehicle height selection switch 110 is normal (N), then the reference vehicle heights Hbfr and Hbfl for the front wheels are set at Hnf and the reference vehicle heights Hbrr and Hbrl for the rear wheels are set at Hnr; and, if said setting of said vehicle height selection switch 110 is low (L), then the reference vehicle heights Hbfr and Hbfl for the front wheels are set at Hlf and the reference vehicle heights Hbrr and Hbrl for the rear wheels are set at Hlr. In any of these three cases, next the flow of control passes to the step 17.

In the step 17, with regard to the four wheels, the differences ΔHi between the actual vehicle heights Hi and the reference vehicle heights Hbi are calculated following the formula expounded below, and then the flow of control passes next to the step 18.

$$\Delta Hi = Hi - Hbi$$

In the step 18, the subroutine whose flow chart is shown in FIG. 4 is carried out with "i" being "fr", to thereby adjust the vehicle riding height for the front right wheel, and then the flow of control passes next to the step 19.

Next, in the step 19, the subroutine whose flow chart is shown in FIG. 4 is carried out with "i" being "fl", to thereby adjust the vehicle riding height for the front left wheel, and then the flow of control passes next to the step 20.

Next, in the step 20, the subroutine whose flow chart is shown in FIG. 4 is carried out with "i" being "rr", to thereby adjust the vehicle riding height for the rear right wheel, and then the flow of control passes next to the step 21.

Finally, in the next step 21, the subroutine whose flow chart is shown in FIG. 4 is carried out with "i" being "rl", to thereby adjust the vehicle riding height for the rear left wheel, and then as before the program flow returns back to the step 1, to loop around again and again.

Although no particular details thereof are given herein in the interests of economy of description, if the conditions which cause nose dive and squat of the vehicle body are detected, a control routine is carried out by an interrupt in order to suppress such undesired phenomena, and in this control routine the degree of flow restriction provided by the flow rate control valves 51 through 54 is increased in order to change the suspension damping effect C to high, and the ON/OFF switching valves 63 through 66 are also opened in order to change the spring rate K to high.

Next, referring to the flow chart shown in FIG. 4, the subroutine which is performed as described above in the steps 18, 19, 20, and 21 for each of the four vehicle wheels, in order to adjust the vehicle riding height at said wheels, will be explained.

In the first step 101, a decision is made as to whether or not the vehicle height difference δHi is more than a controlling threshold value ΔH0. If a decision is made that ΔHi is not more than ΔH0, the flow of control passes next to the step 102; while, on the other hand, if a decision is made that ΔHi is more than ΔH0, the flow of control passes next to the step 105.

In the step 102, a decision is made as to whether or not the vehicle height difference ΔHi is less than −ΔH0. If a decision is made that ΔHi is not less than −ΔH0, the flow of control passes next to the step 103; while, on the other hand, if a decision is made that ΔHi is less than −ΔH0, the flow of control passes next to the step 108.

In the step 103, all the flags Fi are reset to zero, and then the flow of control passes next to the step 104.

In the step 104, supplying of actuating electrical signals is stopped to the flow control valves 18, 19, 28, 29, 32, 33, 39, and 40, and to the switching valves 16, 17, 26, 27, 34, 35, 41, and 42, to thereby cease the adjustment of the vehicle height at all of the four wheels thereof. The supplying of electricity to the motors 79 through 82 and 83 through 86 is also controlled so that the suspension damping effect C is controlled to be in the base mode and so that the spring rate K is set at low. Then the flow of program control passes next to exit from this FIG. 4 subroutine, without doing anything further.

Figure 7:
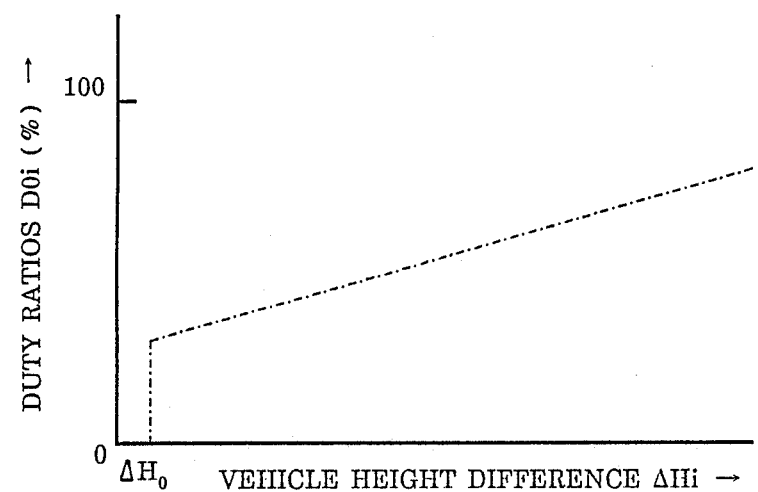
FIG. 7 is a similar graph to FIG. 6, exemplarily showing a map stored in said micro computer and corresponding to the duty ratio for another energizing electrical signal D0i to be supplied to a flow rate control valve for performing normal vehicle height adjustment.

On the other hand, in the step 105, based upon the vehicle height difference ΔHi, a duty ratio DOi for the energizing electrical signal to be supplied to the particular flow rate control valve 32, 33, 39, or 40 for discharging fluid from the actuator 2fr, 2fl, 2rr, or 2fl for this particular vehicle wheel "i" is calculated from the map corresponding to the graph shown in FIG. 7 stored in the ROM 105, and then the flow of control passes next to the step 106.

In the step 106, the flag FDi is set to unity, the flag FTi is reset to zero, an then the flow of control passes next to the step 107.

In the step 107, an energizing electrical signal is supplied with the duty ratio DOi to said particular associated flow rate control valve 32, 33, 39, or 40 for discharging fluid from the actuator 2fr, 2fl, 2rr, or 2rl for this particular vehicle wheel "i", and simultaneously therewith an energizing electrical signal is supplied to the associated switching valve 34, 35, 41, or 42, thus to perform the decreasing adjustment of the vehicle riding height at this particular wheel, and the supplying of electricity to the motors 79 through 82 and 83 through 86 is also controlled so that the suspension damping effect C is controlled to be in the base mode and the spring rate K is set to be at low. Then the flow of program control passes next to exit from this FIG. 4 subroutine, without doing anything further.

In the third program branch, in the step 108, based upon the vehicle height difference ΔHi, a duty ratio DOi for the energizing electrical signal to be supplied to the particular flow rate control valve 18, 19, 28, or 29 for supplying pressurized fluid into the actuator 2fr, 2fl, 2rr, or 2rl for this particular vehicle wheel "i" is calculated from the map corresponding to the graph shown in FIG. 7 stored in the ROM 105, and then the flow of control passes next to the step 109.

In the step 109, the flag FUi is set to unity, the flag FTi is reset to zero, and then the flow of control passes next to the step 110.

In the step 110, an energizing electrical signal is supplied with the duty ratio DOi to said particular associated flow rate control valve 18, 19, 28, or 29 for supplying pressurized fluid into the actuator 2fr, 2fl, 2rr, or 2rl for this particular vehicle wheel "i", and simultaneously therewith an energizing electrical signal is supplied to the associated switching valve 16, 17, 26, or 27, thus to perform the increasing adjustment of the vehicle riding height at this particular wheel, and the supplying of electricity to the motors 79 through 82 and 83 through 86 is also controlled so that the suspension damping effect C is again controlled to be in the base mode and the spring rate K is again set to be at low. Then, again, the flow of program control passes next to exit from this FIG. 4 subroutine, without doing anything further.

Thus, in the steps 101 to 110, the heights from the road surface of the portions of the vehicle body at locations corresponding to the vehicle wheels are adjusted within the desired vehicle height range Hbi ±ΔH0, while the vehicle is not experiencing conditions which cause the vehicle body to roll to an extent more than a predetermined amount. Preferably, the controlling threshold ΔH0 for the vehicle height is set to be substantially equal to or less than the absolute value of the difference ΔHi of the vehicle heights for the vehicle wheels in the case where the absolute value of the roll angle difference $\hat{\phi}$ is $\phi_0$. And, therefore, ΔH0 may be set individually for each wheel, or may be set individually for the front wheels and for the rear wheels.

Next, the operation of the embodiment shown in the figures and described above will be explained.

First, if the vehicle is being operated substantially in the straight ahead running condition, since the steering angle δ is zero, and accordingly $\phi_\infty$ and $\phi_t$ are both substantially zero, in each iteration of the program whose flow chart is shown in FIG. 3 a decision of NO is made in the step 7. In the event where the vehicle height differences ΔHi are within the desired vehicle height ranges Hbi±ΔH0, decisions of NO are made in the steps 101 and 102 shown in FIG. 4, and accordingly no increasing or decreasing adjustment of the vehicle height is performed; the damping effect is controlled to be in the base mode and the spring rate is set to be at low, thereby to enhance the comfortability of the vehicle. In the event where the vehicle height differences ΔHi are more than ΔH0, a decision of YES is made in the step 101; the duty ratio DOi is calculated in the step 105; an energizing electrical signal is supplied with that duty ratio DOi to the appropriate flow control valves for discharging fluid from the appropriate ones of the actuators, and simultaneously therewith an energizing electrical signal is supplied to the associated switching valves, to thereby decreasingly adjust the vehicle height within the desired vehicle height range Hbi±ΔH0. In the event where the vehicle height difference ΔHi is less than −ΔH0, a decision of YES is made in the step 102; the duty ratio DOi is calculated in the step 108; an energizing electrical signal is supplied with that duty ratio DOi to the appropriate flow control valves for supplying pressurized working fluid to the appropriate ones of the actuators, and simultaneously therewith an energizing electrical signal is supplied to the associated switching valves, to thereby increasingly adjust the vehicle height within the desired vehicle height range Hbi±ΔH0.

Next, the operation of this preferred embodiment when the vehicle is in the turning operational condition will be explained with regard to, as an example, the case in which the vehicle is turning in the rightwards direction. The steady state roll angle $\phi_\infty$ and the value of $\hat{\phi}$ increase as the steering angle increases after turning has been initiated. However, in the period where the absolute value of $\hat{\phi}$ is equal to or is less than $\phi_0$, a decision of NO is made in the step 7 of the program whose flow chart is shown in FIG. 3, and thereby the steps 16 through 21 are performed, as in the case of the simple straight ahead vehicle operational condition, so as to adjust the vehicle wheel heights Hi within the desired vehicle wheel height ranges Hbi±ΔH0. However, in the period in which the absolute value of $\hat{\phi}$ exceeds $\phi_0$, a decision of YES is made in the step 7 of the program whose flow chart is shown in FIG. 3; the duty ratio D1i is calculated in the step 11; the turning direction of the vehicle is determined in the step 12; and then the flow of control proceeds to the step 15 by way of the step 13 in the event that $\hat{\phi}$ is smaller than zero, and by way of the step 14 in the event that $\hat{\phi}$ is greater than zero, and the vehicle height adjustment is performed to prevent the vehicle body from rolling, and the suspension damping effect and the spring rate are both switched over to high. In this connection, it will be seen that, if the steering wheel is returned back to the neutral position and the absolute value of $\hat{\phi}$ becomes equal to or less than $\phi_0$, then a decision of NO is made in the step 7 and the flow of program control returns to the normal vehicle height adjusting mode by the steps 16 to 21.

Further, if the steering wheel is rotated oppositely in the vehicle operational condition in which the vehicle is being turned to the right, then a decision of NO is made in the step 8 of the program whose flow chart is shown in FIG. 3, and a decision of YES is made in the step 9, and therefore a decision is made that the steering direction is different from the lateral acceleration of the vehicle body, so that the steps 16 through 21 are carried out after all, so as to adjust the vehicle wheel heights Hi within the desired vehicle wheel height ranges Hbi±ΔH0. Thus, the rolling of the vehicle body is positively prevented. And a similar action is performed in the case of the steering wheel being rotated oppositely in the vehicle operational condition in which the vehicle is being turned to the left, as will be easily understood by one of ordinary skill in the relevant art based upon the above explanations.

From the above description, it will be seen that according to the shown preferred embodiment of the present invention a steady state roll angle $\phi_\infty$ of the vehicle body and a compensating value $\Phi_\infty$ of roll angle are calculated from the vehicle speed V and the steering angle δ; an instantaneous value $\phi_t$ of roll angle of the vehicle body is calculated from the vehicle heights Hi; a roll angle difference $\hat{\phi}$ is calculated from the desired roll angle $\phi_a$, the compensation value $\Phi_\infty$, and the instantaneous value $\phi_t$; and, in the event where the absolute value of the roll angle difference $\hat{\phi}$ is equal to or less than a determinate value, the normal vehicle height adjustment is performed so that the vehicle height can be adjusted within the desired vehicle height range; while, in the event where the roll angle difference $\hat{\phi}$ exceeds the determinate value, the flow rate control valves are operated by electrical signals having duty ratios corresponding to the roll angle difference, so that even in the event of relatively rapid steering roll control is accurately effected without any substantial time lag in response, whereby the vehicle body can be prevented from rolling positively and precisely by anticipatory operation. And, further, in the event when the steering wheel is rotated oppositely during turning of the vehicle around a curve or corner, the rolling of the vehicle body can be positively prevented by means of adjusting the heights of the vehicle wheels within the desired vehicle wheel height ranges.

Although, in the preferred embodiment described above, the determination of the rolling direction of the vehicle body, in the step 12, is performed by determining the sign of the roll angle difference $\hat{\phi}$, on the other hand, in other possible embodiments, this determination could be performed by determining the sign of the compensating value $\Phi_\infty$ of roll angle. Further, while in the preferred embodiment described above the instantaneous value $\phi_t$ of roll angle of the vehicle body was determined by calculation from the vehicle heights Hi at locations corresponding to the vehicle wheels, in other possible embodiments it would be possible for this instantaneous value $\phi_t$ of roll angle of the vehicle body to be determined by direct detection with angular detection devices such as gyroscopes or the like, or by calculation based upon the output of the lateral acceleration sensor 99. It should yet further be noted that in the step 15 during turning the damping effect and the spring rate may be set at high only for the wheels on the radially outward side, and the damping effect may be controlled in the base mode and the spring rate may be set at low for the wheels on the radially inward side. It should further be noted that the program whose flow chart is shown in FIG. 3 may be modified so that the flow of control returns to the step 1 when a decision of YES is made in the decision step 9 thereof, and when a decision of NO is made in the decision step 10 thereof. Yet further, it would be possible in a variant embodiment for a control to be provided in the passenger compartment for the driver to indicate which of a range of set values for $\phi_0$ he or she wished to utilize during vehicle operation, so that the roll control effected by the vehicle roll control system of the present invention would then conform to the operational tastes of the vehicle driver and/or the passengers in the vehicle.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example the actuators 2fr, 2fl, 2rr, and 2rl for controlling the suspension distances of the four vehicle wheels from the vehicle body, rather than being hydraulic actuators as was the case in the shown preferred embodiment, could in an alternative application be electric or pneumatic actuators. Further, the function of such actuators could be provided by a differential twist device provided in the central portion of a stabilizer bar provided between left and right side wheels of the vehicle, as is for example suggested in Japanese Patent Publication Ser. No. 61-24609, which however it is not intended hereby to admit as prior art to the present patent application except to the extent in any case otherwise mandated by applicable law. Other modifications of any particular embodiment of the present invention could be conceived of. Accordingly, the scope of the present invention is to be considered as being delimited, not by any particular perhaps entirely fortuitous details of the disclosed preferred embodiment, or of the drawings, but solely by the scope of the accompanying claims, which follow.

What is claimed is:

1. For a vehicle comprising a body and a plurality of wheels upon which said vehicle runs, a vehicle roll control system of vehicle height adjustment type, comprising:

a plurality of actuator assemblies, each corresponding to one of said vehicle wheels and resiliently suspending a corresponding said vehicle wheel from the vehicle body, each one of said actuator assemblies being adapted to increase or decrease vehicle height at a location corresponding to said corresponding vehicle wheel in accordance with signals supplied thereto;

a plurality of control means, each corresponding to one of said actuator assemblies and serving to supply said control signals to said corresponding actuator assembly;

a vehicle speed detecting means for sensing a road speed of the vehicle;

a steering angle detecting means for sensing a steering angle of the vehicle;

a lateral acceleration detecting means for detecting a lateral acceleration of said vehicle body; and a means for computing and control adapted to predictingly compute the roll angle of the vehicle body based upon the vehicle speed sensed by said vehicle speed detecting means and the steering angle sensed by said steering angle detecting means and to control said plurality of actuator assemblies, via said plurality of control means, in accordance with said computed roll angle, so as to keep the rolling of said vehicle body within a determinate range; said computing and control means including means to compare a direction of the vehicle steering as detected by said steering angle detecting means with a direction of the lateral acceleration of said vehicle body as detected by said lateral acceleration detecting means, and not to effect said controlling of said plurality of actuator assemblies via said plurality of control means, when said direction of the vehicle steering is opposite to said direction of the lateral acceleration of said vehicle body.

2. A system for vehicle roll control according to claim 1 further comprising a plurality of vehicle height detecting means, each corresponding to one of said vehicle wheels and serving for sensing a parameter Hi representative of a height of the vehicle body over said corresponding vehicle wheel, and a means for detecting an actual roll angle $\phi_t$ of said vehicle body; and wherein said computing and control means is adapted to compute differences $\Delta$Hi between said vehicle heights Hi as detected by said vehicle height detecting means and reference vehicle heights; to compute a steady state roll angle $\phi_\infty$ from a current value of vehicle road speed as detected by said vehicle road speed detecting means and a current value of steering angle as detected by said steering angle detecting means; to advance a phase of a signal representative of said steady state roll angle $\phi_\infty$ to thereby compute a compensating value $\Phi_\infty$ for roll angle control; to compute a difference $\hat{\phi}$ based upon a desired roll angle $\phi_a$ of said vehicle body, said compensating value $\Phi_\infty$, and said actual roll angle $\phi_t$ following the equation:

$$\hat{\phi} = \phi_a - (k1\,\phi_\infty + k2\,\phi_t)$$

wherein k1 and k2 are positive constants; to control said plurality of actuator assemblies, when the absolute value of said difference $\hat{\phi}$ is larger than a determinate value, via said plurality of control means, in accordance with said difference $\hat{\phi}$; and to control said plurality of actuator assemblies, when the absolute value of said difference $\hat{\phi}$ is smaller than said determinate value, via said plurality of control means, in accordance with said vehicle height differences $\Delta Hi$, so as to keep the absolute values of said vehicle height differences $\Delta Hi$ below determinate values.

3. A system for vehicle roll control according to claim 1, further comprising a means for detecting an actual roll angle of said vehicle body, and a plurality of vehicle height detecting means each corresponding to one of said vehicle wheels and serving for sensing a parameter representative of a height of the vehicle body over said corresponding vehicle wheel, said computing and control means being adapted to compute both a roll angle of said vehicle body with respect to front vehicle wheels and also a roll angle of said vehicle body with respect to rear vehicle wheels from vehicle height differences between left and right sides of said vehicle body based upon the vehicle heights sensed by said vehicle height detecting means and the distances between the left and the right vehicle wheels, and to compute as said actual roll angle the average of these two roll angles.

4. For a vehicle comprising a body and a plurality of wheels upon which said vehicle runs, a vehicle roll control system of vehicle height adjustment type, comprising:

a plurality of actuator assemblies, each corresponding to one of said vehicle wheels and resiliently suspending a corresponding said vehicle wheel from the vehicle body, each one of said actuator assemblies being adapted to increase or decrease vehicle height at a location corresponding to said corresponding vehicle wheel in accordance with control signals supplied thereto;

a plurality of control means, each corresponding to one of said actuator assemblies and serving to supply said control signals to said corresponding actuator assembly;

a plurality of vehicle height detecting means each corresponding to one of said vehicle wheels and serving for sensing parameters representative of the height of the vehicle body over said corresponding vehicle wheel;

a vehicle speed detecting means for sensing a road speed of the vehicle;

a steering angle detecting means for sensing a steering angle of the vehicle;

a lateral acceleration detecting means for detecting a lateral acceleration of said vehicle body; and a means for computing and control adapted to predictingly compute the roll angle of the vehicle body based upon the vehicle speed sensed by said vehicle speed detecting means and the steering angle sensed by said steering angle detecting means and to control said plurality of actuator assemblies, via said plurality of control means, in accordance with said computed roll angle, so as to keep the rolling of said vehicle body within a determinate range; said computing and control means comprising means to compare a direction of the vehicle steering as detected by said steering angle detecting means with a direction of the lateral acceleration of said vehicle body as detected by said lateral acceleration detection means, and, when said direction of the vehicle steering is opposite to said direction of the lateral acceleration of said vehicle body, to compute differences between the actual vehicle heights as sensed by said plurality of vehicle height detection means and reference vehicle heights, and to control said plurality of actuator assemblies, via said plurality of control means, so as to keep said differences within determinate ranges.

5. A system for vehicle roll control according to claim 1 or claim 4, wherein said determinate range for said vehicle body rolling represents substantially zero vehicle body rolling.

6. A system for vehicle roll control according to claim 1 or claim 4, wherein said computing and control means comprises a memory means, and said memory means stores a relationship between vehicle speeds, steering angles, and steady state roll angles.

7. A system for vehicle roll control according to claim 1 or claim 4, further comprising a means for detecting an actual roll angle $\phi_t$ of said vehicle body, and wherein said computing and control means is adapted to compute a steady state roll angle $\phi_\infty$ from a current value of the vehicle road speed as detected by said vehicle road speed detecting means and a current value of the steering angle as detected by said steering angle detecting means; to advance a phase of a signal representative of said steady state roll angle $\phi_\infty$ to thereby compute a compensating value $\Phi_\infty$ for roll angle control; to compute a difference $\hat{\phi}$ based upon a desired roll angle $\phi_a$ of said vehicle body, said compensating value $\Phi_\infty$, and said actual roll angle $\phi_t$ following the equation:

$$\hat{\phi} = \phi_a - (k1\phi_\infty + k2\phi_t)$$

where k1 and k2 are positive constants; and to control said plurality of actuator assemblies, via said plurality of control means, in accordance with said difference $\hat{\phi}$, when the absolute value of said difference $\hat{\phi}$ is larger than a determinate value.

8. A system for vehicle roll control according to claim 4, further comprising a means for detecting an actual roll angle of said vehicle, wherein said computing and control means is adapted to compute both a roll angle of said vehicle body with respect to front vehicle wheels and also a roll angle of said vehicle body with respect to rear vehicle wheels from vehicle height differences between left and right sides of said vehicle body based upon the vehicle heights sensed by said vehicle height detecting means and the distances between the left and the right vehicle wheels, and to compute as the actual roll angle the average of these two roll angles.

9. A system for vehicle control according to claim 4 including means for detecting an actual roll angle $\phi_t$ of said vehicle body; and wherein said computing and control means is adapted to compute differences between said vehicle heights as detected by said vehicle height detecting means and reference vehicle heights; to compute a steady state roll angle $\phi_\infty$ from a current value of vehicle road speed as detected by said vehicle road speed detecting means and a current value of steering angle as detected by said steering angle detecting means; to advance a phase of a signal representative of said steady state roll angle $\phi_\infty$ to thereby compute a compensating value $\Phi_\infty$ for roll angle control; to compute a difference $\hat{\phi}$ based upon a desired roll angle $\phi_a$ of said vehicle body, said compensating value $\Phi_\infty$, and said actual roll angle $\phi_t$ following the equation:

$$\hat{\phi} = \phi_a - (K1\, \phi_\infty + K2\, \phi_t)$$

wherein k1 and k2 are positive constants; to control said plurality of actuator assemblies, when the absolute value of said difference $\hat{\phi}$ is larger than a determinate value, via said plurality of control means, in accordance with said difference $\hat{\phi}$; and to control said plurality of actuator assemblies, when the absolute value of said difference $\phi$ is smaller than said determinate value, via said plurality of control means, in accordance with said vehicle height differences, so as to keep the absolute values of said vehicle height differences below determinate values.

* * * * *